United States Patent
Bestermann

(10) Patent No.: US 8,489,101 B1
(45) Date of Patent: Jul. 16, 2013

(54) CALL DELIVERY IN CONVERGED NETWORKS

(75) Inventor: John R. Bestermann, Suwanee, GA (US)

(73) Assignee: ARRIS Group, Inc., Suwanee, GA (US)

( * ) Notice: Subject to any disclaimer, the term of this patent is extended or adjusted under 35 U.S.C. 154(b) by 211 days.

(21) Appl. No.: 12/870,950

(22) Filed: Aug. 30, 2010

Related U.S. Application Data

(60) Provisional application No. 61/237,849, filed on Aug. 28, 2009.

(51) Int. Cl.
*H04W 40/00* (2009.01)

(52) U.S. Cl.
USPC .......... 455/445; 455/432.2; 370/466; 370/467

(58) Field of Classification Search
USPC ............... 455/403, 41.1–41.2, 436–439, 440, 455/442, 444, 445, 446, 432.2; 370/328, 370/338, 331–332, 466, 467, 469, 395.5, 370/395.52
See application file for complete search history.

(56) References Cited

U.S. PATENT DOCUMENTS

| | | | |
|---|---|---|---|
| 2002/0136226 A1* | 9/2002 | Christoffel et al. | 370/401 |
| 2007/0070948 A1* | 3/2007 | Kezys et al. | 370/331 |
| 2008/0081617 A1* | 4/2008 | Yoo et al. | 455/433 |
| 2008/0102843 A1* | 5/2008 | Todd et al. | 455/445 |
| 2009/0147778 A1* | 6/2009 | Wanless et al. | 370/389 |
| 2009/0298496 A1* | 12/2009 | Pettersson et al. | 455/434 |
| 2009/0323632 A1* | 12/2009 | Nix | 370/331 |
| 2010/0009674 A1* | 1/2010 | Sapkota et al. | 455/426.1 |
| 2010/0153563 A1* | 6/2010 | Ku | 709/228 |

* cited by examiner

*Primary Examiner* — Cong Tran
(74) *Attorney, Agent, or Firm* — Troy A. Van Aacken; Robert J. Starr

(57) ABSTRACT

Methods, systems, and apparatus can be used to provide call routing in converged networks. In various examples, a converged call routing system can be used determine routing information associated with an incoming connection request. Routing information can be based upon one or more of a current location of a communications device or a profile associated with a communications device.

19 Claims, 5 Drawing Sheets

CALL DELIVERY IN CONVERGED NETWORKS

TECHNICAL FIELD

This disclosure relates to routing communications.

BACKGROUND

Mobile communications devices have become ubiquitous in modern society. Mobile communications devices can typically allow users to make telephone calls, send or receive electronic mail (e-mail), browse the world wide web, check appointments, and get directions, as well as perform many other functions. Telephone calls are typically handled via cellular networks. However, cellular networks can vary in quality and coverage area. Improving the coverage of mobile communications devices can improve service quality and thereby increase use of mobile communications devices.

BRIEF DESCRIPTION OF THE DRAWINGS

Like reference numbers and designations in the various drawings indicate like elements.

DETAILED DESCRIPTION

In some implementations of this disclosure, systems and methods can operate to provide call delivery in converged networks. For example, mobile communications devices (e.g., mobile phones, personal digital assistants (PDAs), etc.) can provide both cellular connectivity as well as internet protocol (IP) data connectivity through, for example, a wireless data network (e.g., wireless local area network (WLAN), wireless personal area network (WPAN), wireless metropolitan area networks (WMAN), wireless wide area networks (WWAN), 802.11 standards (Wi-Fi), WiMax, G.hn, Bluetooth, etc.). While the cellular connectivity is typically used to communicate voice traffic, the IP network can also be used to transmit voice traffic using, for example, voice over internet protocol (VoIP). Thus, in some implementations, a network device (e.g., a home location register (HLR)) can be configured to provide converged call routing capabilities based upon a user profile and/or current location of a mobile communications device within a cellular network, such that a call to a user can be routed via either the cellular network or an IP network.

Figure 1:
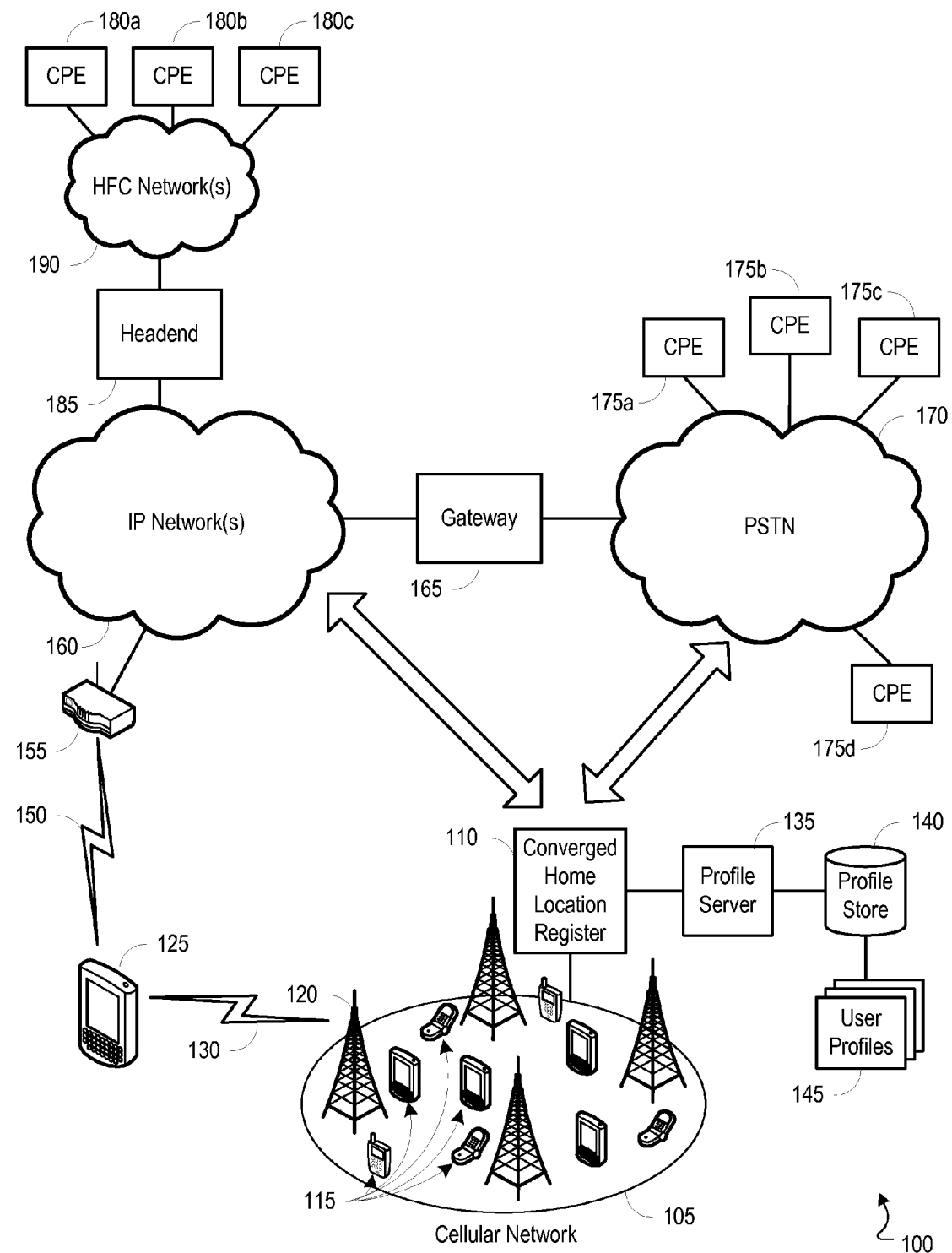
FIG. 1 is a block diagram illustrating an exemplary network environment operable to provide call delivery in converged networks.

FIG. 1 is a block diagram illustrating an example network environment 100 operable to provide call delivery in converged networks. In some implementations, a cellular network 105 can include a converged home location register 110 (e.g., a mobility application server (MAS)). The cellular network 105 can further include a number of mobile communications devices 115 and cellular towers 120. Each of the cellular towers can communicate with mobile communications devices 115, 125 in a cell assigned to that cellular tower. For example, mobile communications device 125 can communicate with the cellular tower 120 via wireless link 130.

To facilitate routing of telephone calls to the mobile communications device 125, a home location register (HLR) periodically receives an update (e.g., a location beacon) from the mobile communications device 125. The HLR identifies the location (e.g., cell) associated with the mobile communications device 125 and stores the location information in a current location store such that incoming calls destined for the mobile communications device 125 can be properly routed. Thus, for example, an incoming call can be routed to a cellular tower 120 closest in proximity to the mobile communications device 125 (e.g., the cellular tower responsible for the cell from which the last beacon signal was received).

In some implementations, the HLR can be a converged home location register 110. The converged home location register 110 can operate to route calls to a cellular tower based upon retrieval of current location information associated with a mobile communications device retrieved from a current location store. The converged home location register 110 can also operate to determine whether alternative routing information is available for a mobile communications device. In some implementations, alternative routing information can be obtained from a profile server 135 operating in conjunction with a profile store 140.

The profile store 140 can operate to store profiles 145 associated with mobile communication device users. In some implementations, the profiles 145 can include alternative public switch telephone network (PSTN) routing information and/or alternative IP routing information for the mobile communications device. In additional implementations, the profiles 145 can include user preferences. The user preferences can provide preferences for routing incoming telephone calls. Thus, for example, a user might specify that incoming calls should be routed via a wireless data interface, when available. Alternatively, a user might specify that incoming calls should be routed to an alternative PSTN number when a wireless call is not successfully connected after a predefined period of time (e.g., a number of rings). It should be understood that the profile can be flexible enough to provide a wide variety of ways for the user to configure routing of incoming calls.

In some implementations, a user can express call routing preferences in terms of calling number identification. Thus, for example, a user may define a group of calling numbers (e.g., originating numbers) who are permitted to be routed or rerouted to a mobile communications device 125 through a WLAN device 155, while other calling numbers are not rerouted to the mobile communications device 125 through alternative routing information. In other implementations, the a user can define a user profile noting that all calls should be rerouted using alternative routing information upon determination that standard routing information cannot be used to route the call (e.g., based upon broken links in the wireless network, unknown location of the mobile communications device, an unanswered attempt to connect to the mobile communications device, etc.).

In some implementations, the mobile communications device 125 can also communicate via wireless data link 150 with a WLAN device, such as, for example, a wireless router 155. The wireless router 155 can be connected to a packet based network, such as an IP network 160.

In some implementations, when a wireless data link 150 is available, the converged home location register 110 can route an incoming call to the mobile communications device 125 through the IP network 160 via a wireless router 155 and the wireless data link 150. In other implementations, when a PSTN 170 customer premise equipment (CPE) 175*a-d* is available and a cellular link 130 is not available, the converged home location register can route the calls using PSTN routing information from a user profile.

However, it should be understood that calls routed through the wireless data link 150 only have a limited range, thereby reducing the mobility of the user. This reduced mobility, in turn, reduces the utility of the mobile communications device 125 to the user. In some implementations, the converged home location register 110 can operate to switch calls between a wireless data interface and a cellular interface. Thus, when a user moves his/her mobile communications device 125 out of range of a wireless data access point device 155, the converged home location register 110 can hold the call open and reconnect to the device 125 via a cellular interface of the device 125. Alternatively, if the device moves out of range of the wireless data access point device 155, and into range of another wireless data access point device (not shown), the call can be routed to the new wireless data access point. Thus, in some implementations, the converged home location register 110 can facilitate intra-call handoff between multiple different wireless protocols, for example, including cellular, various 802.11 standards (e.g., 802.11a, 802.11b, 802.11g, 802.11n, etc.), Bluetooth, Wi-Max, HiperLAN, etc. In some such implementations, the mobile communications device 125 can hold open a cellular control signal link to the converged home location register 110, thereby facilitating faster handoff between the data network and the cellular network.

In those instances where a call is routed from an IP network 160 to the PSTN network 170, or a call is routed from the PSTN network 170 to an IP network 160 a gateway 165 can be used to translate communication protocols between the network. For example, the gateway 165 can convert packet based voice communications to circuit switched voice for transmission on the PSTN 170, and can convert circuit switched voice to packet based voice communications for transmission on an IP network 160.

In some implementations, calls can also be originated or routed to CPE devices 180*a-c* via a headend 185 and one or more hybrid fiber coax (HFC) networks 190. The headend 185 and hybrid fiber coax network(s) 190 can be provided by multiple service operators (MSOs) which provide community antenna television (CATV) to subscribers.

It should be understood that while the converged home location register 110 is described as residing on the cellular network 105, similar systems can be provided on the PSTN 170, an IP network 160, or a headend system 185. Thus, for example, a call destined for a CPE device 180*a-c* can be rerouted to an associated mobile communications device 125 via a cellular link 130 or a wireless data link 150 based upon a user profile and/or preferences 145. Alternatively, a call destined for a CPE device 180*a-c* can be rerouted to an associated PSTN CPE device 175*a-d* based upon a user profile and/or preferences 145. In those implementations where the converged routing is provided on the PSTN 170, user profiles can be provide in associated with a service control point (SCP) of a signaling network (e.g., signaling system 7 (SS7) network), such that routing instructions provided by the SCP to service switching points (SSPs) can include alternative routing instructions from a user profile if standard routing of the call is unavailable for some reason (e.g., including undesired calls). In those implementations where the converged routing is provided by a cable network, the headend 185 can provide routing instructions can include alternative routing instructions from a user profile if a call destined for a CPE device 180*a-c* which is unavailable for some reason.

Figure 2:
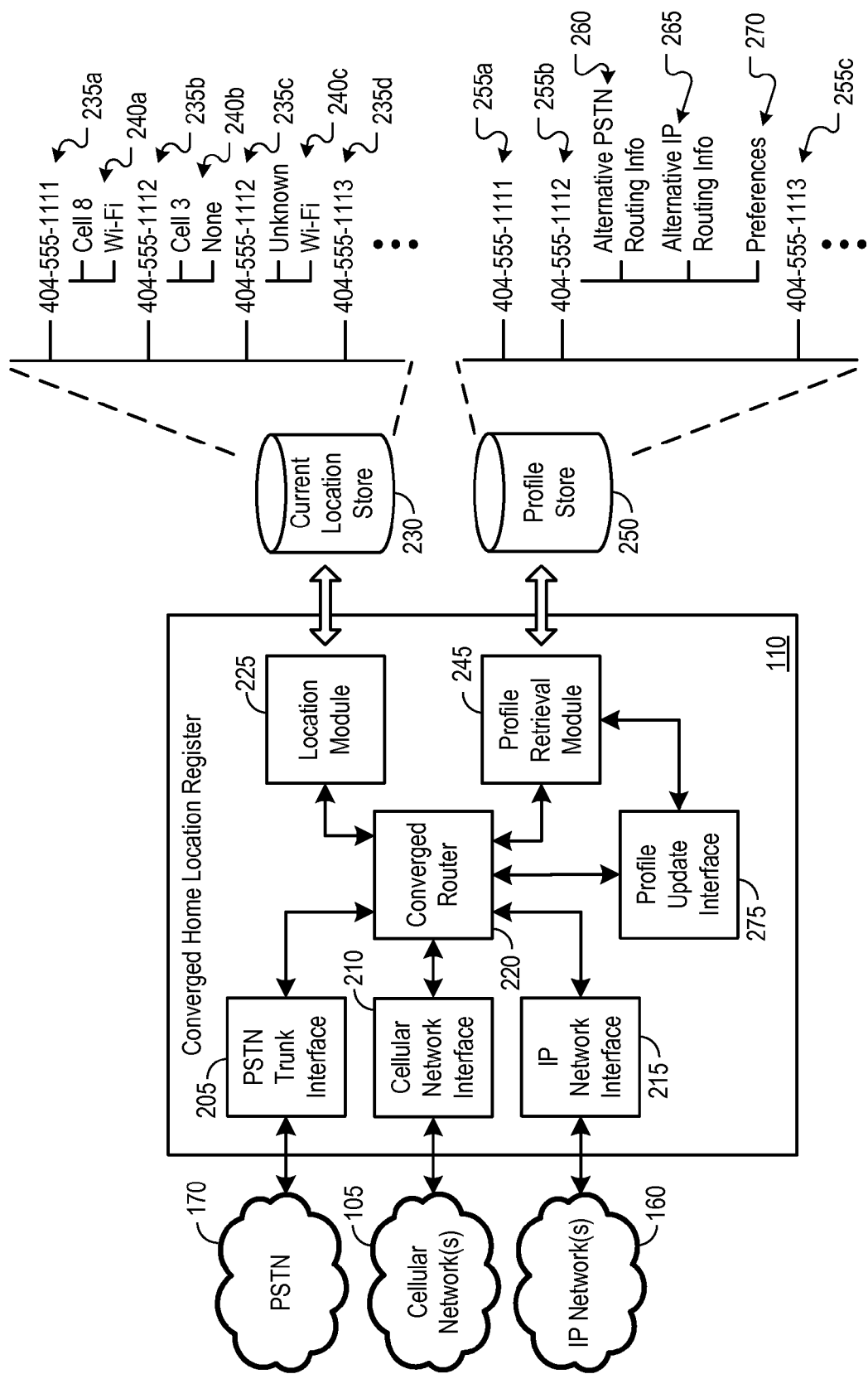
FIG. 2 is a block diagram illustrating a converged home location register.

FIG. 2 is a block diagram illustrating a converged routing system such as a converged home location register 110. In some implementations, a converged home location register 110 can include a PSTN trunk interface 205, a wireless network interface 210, and/or an IP network interface 215. The PSTN trunk interface 205 can be operable to provide communications to a PSTN network 170 and receive communications from the PSTN network 170. The cellular network interface 210 can be operable to provide communications to a cellular network 105 and receive communications from the cellular network 105. In some implementations, the cellular network interface 210 can be part of the PSTN interface 205, since the cellular network 105 shares similar signaling protocols with the PSTN 170. The IP network interface 215 can be operable to provide communications to an IP network 160 and to receive communications from the IP network 160.

It should be understood that the converged home location register 110, in some implementations, may include only a single network interface, and signals can be sent through the interfaced network to other of the network types. For example, in implementations where only a PSTN network interface is provided, the PSTN network interface can transmit data signals through the PSTN network and over a gateway to an IP network or a cellular network. In additional implementations, the converged routing system can include a headend interface operable to communicate with a headend device, and to communicate routing information to a cable modem termination system residing at the headend.

The converged home location register 110 can further include a converged router 220. The converged router 220 can receive connection requests and route the connection requests based upon a location associated with a mobile communications device identified by the connection request. In some implementations, the converged router 220 can retrieve location information from a location module 225. The location module 225 can be, for example, a server operable to keep track of the location of mobile communications devices. In some implementations, the location module 225 can use a current location store 230 to track the current location of a mobile communications device. Thus, when a location beacon signal is received from a mobile communications device, it can be routed to the converged home location register and the location module can identify location information associated with the location beacon and store the location information to the current location data store 230.

In some implementations, the current location data store 230 can include a number of records 235*a-d* associated with mobile devices. The records can be keyed, for example, by device identification such as the telephone number, mobile identification number (MIN), subscriber identity module (SIM) international mobile subscriber identity (IMSI), or media access control (MAC) address associated with the mobile communications device. In some implementations, the record can include a last known location 240*a-c* of the mobile communications device within a cellular network and/or whether the device has registered as having wireless data access (e.g., including a type of wireless data connection available). In further implementations, the record can also include a determination of whether a current location beacon for the mobile communications device has been received. If a current location beacon for the mobile communications device has not been received, the location of a mobile communications device, such as mobile communications device 235*c*, can be marked as unknown 240*c*, indicating that the current location of the mobile communications device is unknown.

Upon receiving location information from the location module 230 the converged router 220 can attempt to route the connection request. In some implementations, if the location of a mobile communications device is unknown, the converged router 220 can retrieve a profile associated with the mobile communications device. In other implementations, the profile is retrieved even if the location of the mobile communications device within a cellular network is known. The call can then be routed in accordance with user preferences provided by the profile. For example, if the user prefers to receive calls via a wireless data connection and a wireless data connection is available, the call can be routed via an IP network. However, if the wireless data connection is not available, the calls can be routed via a cellular network. In additional implementations, the profile can include a landline phone to which a call can be routed based upon the users preferences.

In some implementations, the profile associated with the mobile communications device can be retrieved from a profile retrieval module 245. The profile retrieval module 245, for example, can be a server operable to store profiles and retrieve profiles upon command. The profiles can be retrieved, for example, from a profile data store 250. The profile data store 250 can include a number of records 255a-c associated with mobile communications devices. The records 255a-c can be keyed, for example, by a telephone number associated with the mobile communications device. However, it should be understood that the records can be keyed by any identification mechanism that is operable to uniquely identify the mobile communications device (including, e.g., MIN, SIM, IMSI, MAC address, etc.). The records 255a-c can include alternative routing information, e.g., including alternative PSTN routing information 260, alternative IP routing information 265, and/or preferences 270. In some implementations, the preferences can provide for situations in which the call is to be routed using one or more of the alternative routing information fields 260, 265. In other implementations, the preferences 270 can provide for instruction on which of the alternative routing information fields 260, 265 should be used, and/or a priority order in which those alternative routing information 260, 265 is to be used.

Upon receiving the alternative routing information, the converged router 220 can determine which of one or more interfaces 205, 210, 215 to use to route the connection request. In some implementations, after a connection has been made, the converged router 220 can continue to route voice traffic. Such implementations can facilitate, for example, metering of voice services by a cellular network.

In alternative implementations, the converged router 220 can retrieve alternative routing information 260, 265 and/or preferences 270 prior to attempting to route the connection request to the mobile communications device based upon location information 240a-c retrieved from the current location store 230. In such implementations, the converged router 220 can apply preferences 270, including any call delivery priorities included in the profile information. Thus, for example, a current location for a mobile device may be retrievable, however, the preferences associated with the mobile device may indicate that the user would like the call to be delivered via WLAN, if a WLAN connection is available. The converged router 220 can therefore attempt to contact the mobile communications device using the alternative IP routing information 265 in the profile record 255b. This attempt to contact the mobile communications device can be accomplished, for example, by pinging an address associated with the mobile communications device. The address can be retrieved, for example, from a registry using a device ID associated with the mobile communications device.

Figure 3:
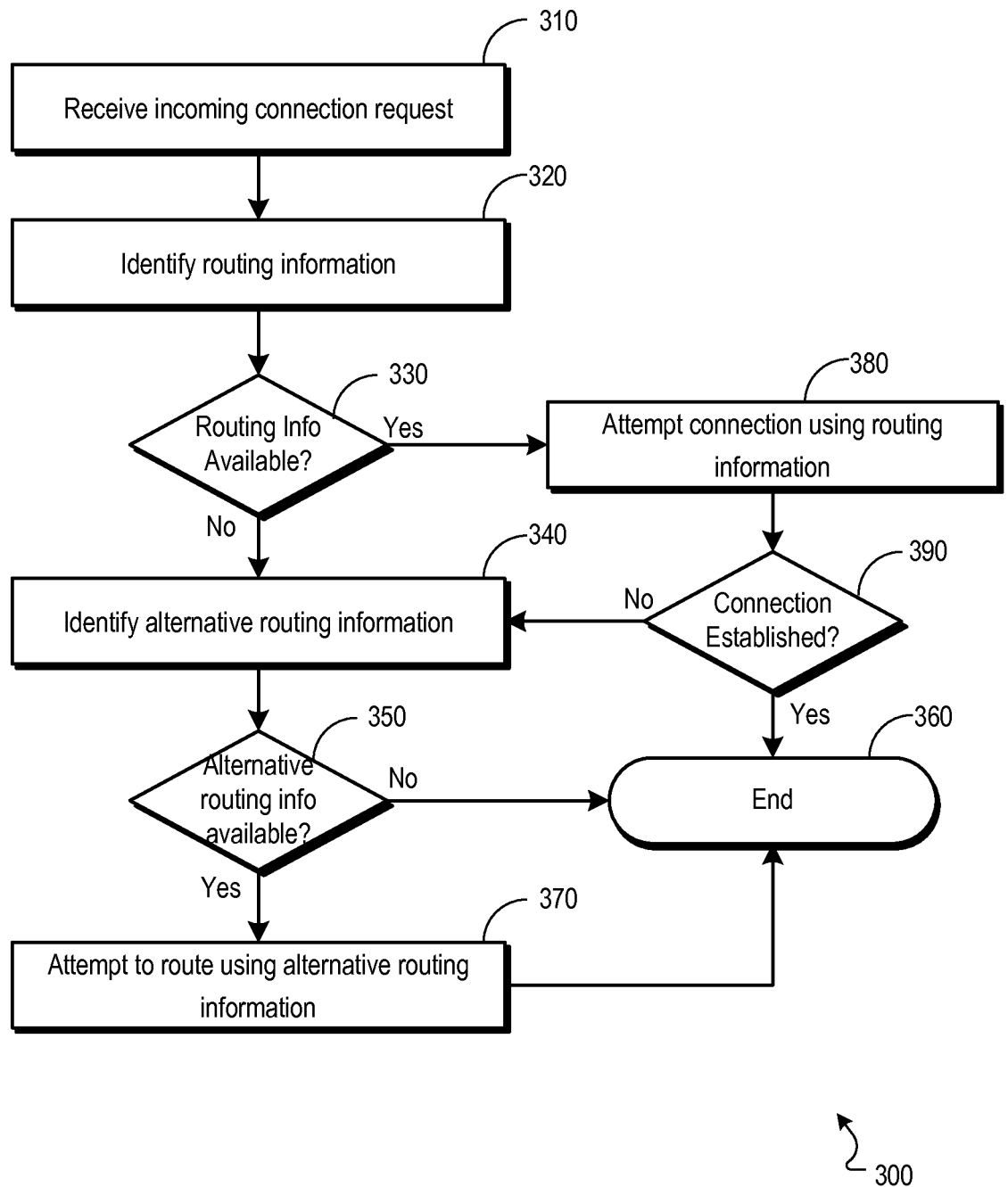
FIG. 3 is a flowchart illustrating an example process for providing call delivery in converged networks.

FIG. 3 is a flowchart illustrating an example process 300 for providing call delivery in converged networks. At stage 310, an incoming connection request is received. The incoming connection request can be received, for example, by a converged routing system (e.g., converged home location register 110 of FIG. 1) via a network interface (e.g., PSTN network interface 205, cellular network interface 210, or IP network interface 215 of FIG. 2) and a converged router (e.g., converged router 220 of FIG. 2). In various examples, the incoming connection request is an incoming call received from an SS7 network or from a session initiation protocol (SIP) proxy server.

At stage 320, routing information associated with the connection request is identified. The routing information can be identified, for example, by a converged router (e.g., converged router 220 of FIG. 2) in conjunction with a location server (e.g., location module 225 of FIG. 2) and a current location store (e.g., current location store 230 of FIG. 2). In some implementations, the current location can be identified by a cell from which a current location beacon has been received. In other examples, the location can be identified by a cellular tower which received a current location beacon or any other mechanism operating to provide information identifying the location of a mobile communications device. In further implementations, the current location can include whether the wireless communications device is accessible via a wireless data connection (e.g., wi-fi, Bluetooth, Wi-Max, etc.).

At stage 330, a determination is made whether routing information is available. The determination can be made, for example, by a converged router (e.g., converged router 220 of FIG. 2) in conjunction with a location server (e.g., location module 225 of FIG. 2) and a current location store (e.g., current location store 230 of FIG. 2). In some implementations, the determination can be made based upon whether a current location beacon for the mobile communications device has been received.

If no routing information is available, alternative routing information can be identified at stage 340. Alternative routing information can be identified, for example, by a converged router (e.g., converged router 220 of FIG. 2) in conjunction with a profile server (e.g., profile retrieval module 245 of FIG. 2) and a profile store (e.g., profile store 250 of FIG. 2). The alternative routing information can include alternative PSTN routing information, alternative IP routing information, or any other alternative routing mechanism that may be entered by the user.

At stage 350, a determination is made whether alternative routing information is available. The determination can be made, for example, by a converged router (e.g., converged router 220 of FIG. 2) in conjunction with a profile server (e.g., profile retrieval module 245 of FIG. 2) and a profile store (e.g., profile store 250 of FIG. 2).

If no alternative routing information is available, the process 300 ends at stage 360. Alternatively, if alternative routing information is available, the connection request can be routed using the alternative routing information at stage 370. The connection request can be routed, for example, by a converged router (e.g., converged router 220 of FIG. 2) in conjunction with a network interface (e.g., PSTN network interface 205, cellular network interface 210, IP network interface 215 of FIG. 2). The process then ends at stage 360.

Returning to stage 330, if routing information for the mobile communications device is identified, a connection can be attempted based upon the identified routing information at stage 380. The connection can be attempted, for example, by a converged router (e.g., converged router 220 of FIG. 2) in conjunction with a cellular network interface (e.g., cellular network interface 210 of FIG. 2).

At stage 390 a determination can be made whether the connection has been established. The determination can be made, for example, by a converged router (e.g., converged router 220 of FIG. 2) in conjunction with a cellular network interface (e.g., cellular network interface 210 of FIG. 2). If a connection is established, the process 300 ends at stage 360.

Alternatively, if no connection is established, the process can continue at stage 340, where alternative routing information is identified. The process can then proceed as outlined above. It should be understood that in some implementations, the determination of whether a connection is established at stage 390 can be skipped, and the process can end directly after stage 380. Thus, a check for alternative routing information is not performed after determining that standard routing information exists. It should further be understood that in those implementations where the converged routing system resides on the PSTN, an IP network, or a headend system that the process can be modified based upon the details of such alternative implementations.

Figure 4:
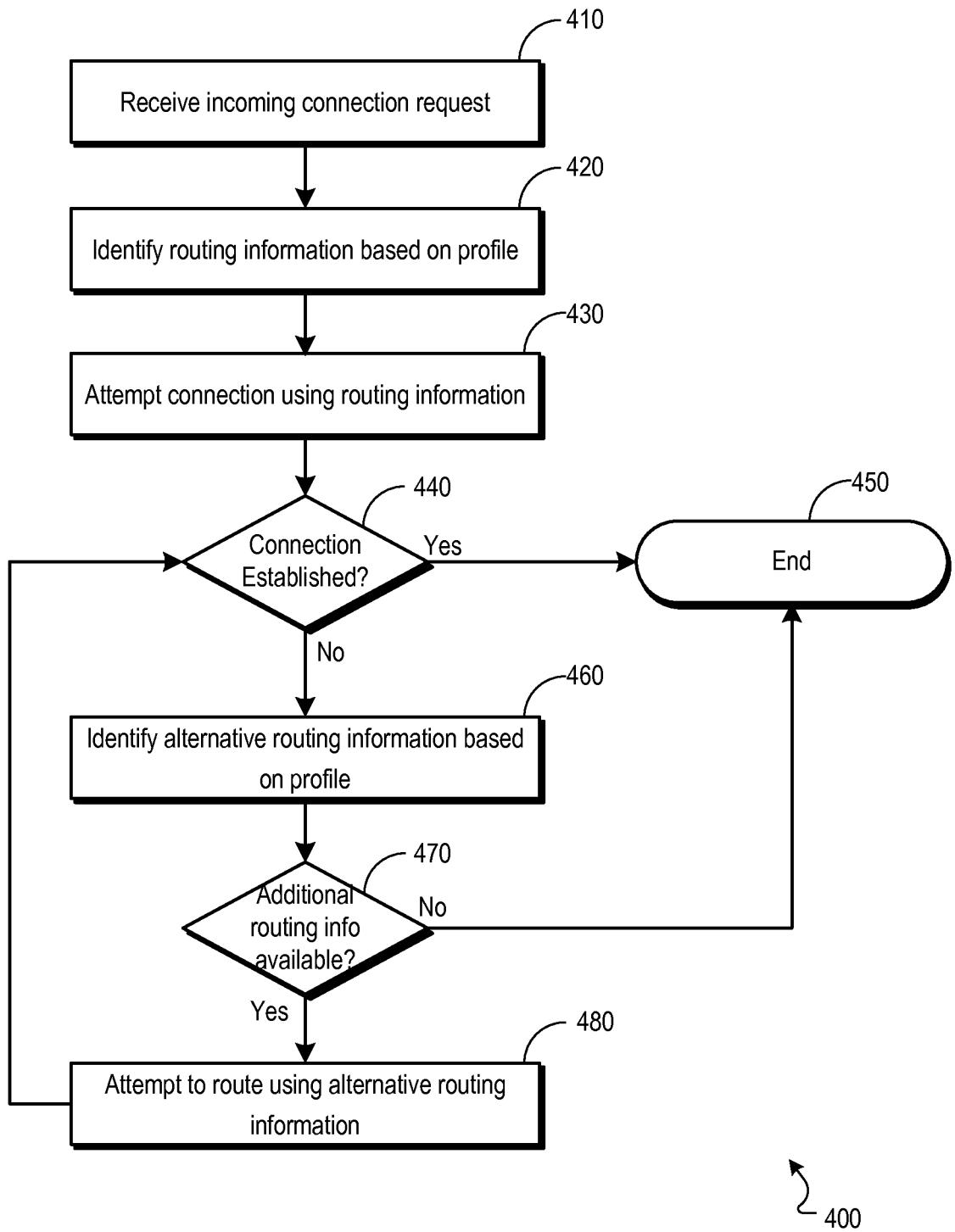
FIG. 4 is a flowchart illustrating another example process for providing call delivery in converged networks.

FIG. 4 is a flowchart illustrating another example process 400 for providing call delivery in converged networks. At stage 410, an incoming connection request is received. The incoming connection request can be received, for example, by a converged routing system (e.g., converged home location register 110 of FIG. 1) via a network interface (e.g., PSTN network interface 205, cellular network interface 210, or IP network interface 215 of FIG. 2) and a converged router (e.g., converged router 220 of FIG. 2). In various examples, the incoming connection request is an incoming call received from an SS7 network or from a session initiation protocol (SIP) proxy server.

At stage 420, routing information associated with the connection request is identified based upon a profile. The routing information can be identified, for example, by a converged router (e.g., converged router 220 of FIG. 2) in conjunction with a profile server (e.g., profile retrieval module 245 of FIG. 2) and a profile store (e.g., profile store 250 of FIG. 2). In some implementations, the profile can include preference(s) and alternative routing information. Alternative routing information can include, for example, alternative PSTN routing information, alternative IP routing information, or any other alternative routing mechanism operable to route the connection request.

At stage 430, a connection can be attempted based upon the identified routing information. The connection can be attempted, for example, by a converged router (e.g., converged router 220 of FIG. 2) in conjunction with a network interface (e.g., PSTN network interface 205, cellular network interface 210, IP network interface 215 of FIG. 2).

At stage 440, a determination can be made whether the connection has been established. The determination can be made, for example, by a converged router (e.g., converged router 220 of FIG. 2) in conjunction with a network interface (e.g., PSTN network interface 205, cellular network interface 210, IP network interface 215 of FIG. 2). If a connection is established, the process 400 ends at stage 450.

Alternatively, if no connection is established, alternative routing information can be identified based upon a device profile at stage 460. Alternative routing information can be identified, for example, by a converged router (e.g., converged router 220 of FIG. 2) in conjunction with a profile server (e.g., profile retrieval module 245 of FIG. 2) and a profile store (e.g., profile store 250 of FIG. 2). The alternative routing information can include alternative PSTN routing information, alternative IP routing information, alternative cellular routing information, or any other alternative routing mechanism that may be entered by the user.

At stage 470, a determination is made whether alternative routing information is available. The determination can be made, for example, by a converged router (e.g., converged router 220 of FIG. 2) in conjunction with a profile server (e.g., profile retrieval module 245 of FIG. 2) and a profile store (e.g., profile store 250 of FIG. 2).

If no alternative routing information is available, the process 400 ends at stage 450. Alternatively, if alternative routing information is available, the connection request can be routed using the alternative routing information at stage 480. The connection request can be routed, for example, by a converged router (e.g., converged router 220 of FIG. 2) in conjunction with a network interface (e.g., PSTN network interface 205, cellular network interface 210, IP network interface 215 of FIG. 2).

The process 400 then determines whether the connection is established at stage 440. If a connection is established, the process 400 ends at stage 450. Alternatively, if no connection is established, further alternative routing information can be identified at stage 460. If no further routing information is available, the process ends at stage 450. The process 400 can thereby continue trying alternative routing information until no further alternative routing information is available.

Figure 5:
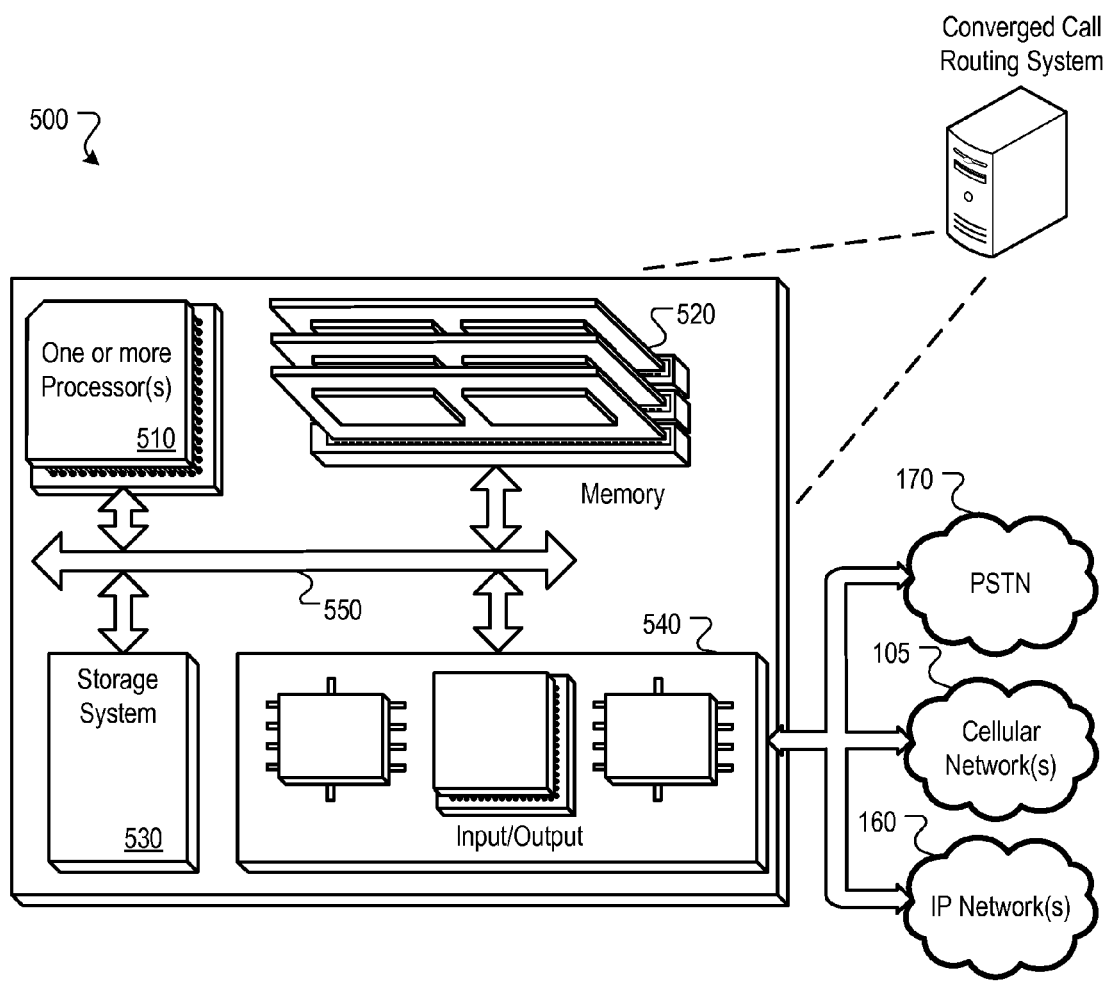
FIG. 5 is a block diagram illustrating an example converged call routing system operable to provide call delivery in converged networks.

FIG. 5 is a block diagram illustrating an example converged call routing system operable to provide call delivery in converged networks. The converged call routing system 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a PSTN trunk interface (e.g., an RJ11 connector), an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The converged call routing system (e.g., converged home location register) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer implemented method, comprising:
   receiving an incoming connection request to initiate a voice call to a mobile communications device;
   identify routing information associated with incoming connection request, the routing information specifying whether a connection should be initiated using a wireless data connection or using a cellular connection;
   if the routing information specifies initiating incoming connections using the wireless data connection, attempting to first initiate a connection responsive to the incoming connection request using the wireless data connection;
   if the routing information specifies initiating incoming connections using the cellular connection, attempting to initiate a connection responsive to the incoming connection request using the cellular connection.

2. The computer implemented method of claim 1, wherein the wireless data connection is made via an internet protocol network.

3. The computer implemented method of claim 1, wherein the wireless data connection is made using a media terminal adapter accessible through a hybrid fiber-cable network.

4. The computer implemented method of claim 1, further comprising retrieving the routing information from a converged home location register.

5. The computer implemented method of claim 4, wherein the routing information is further based upon profile information associated with an intended recipient of the voice call.

6. The computer implemented method of claim 5, wherein the routing information is further based upon an originator of the voice call.

7. The computer implemented method of claim 1, further comprising performing a handoff between the wireless data network and the cellular network if the mobile communications device moves out of range of the wireless data connection.

8. The computer implemented method of claim 1, wherein a connection attempt using the cellular connection is made first, and if the connection attempt is not successful before a predetermined period of time has elapsed, the wireless data connection is attempted.

9. The computer implemented method of claim 1, further comprising:
   receiving a beacon from a mobile communications device;
   recording a location associated with the beacon within a converged home location register; and
   using the converged home location register to identify the routing information associated with the mobile communications device.

10. The computer implemented method of claim 9, further comprising recording whether a wireless data connection is available to the mobile communications device.

11. A system, comprising:
    a network interface operable to receive connection requests for initiating incoming voice calls;
    a converged router operable to retrieve location information from a location register and profile information from a profile data store responsive to the connection request to initiate a voice call, and to make a call routing decision on the connection request responsive to the location information and the profile information;
    the network interface being further operable to attempt to initiate a session with a called party based on the connection request using a wireless data connection, and if initiating the session using the wireless data network fails, the network interface is operable to attempt to initiate the session using a cellular connection responsive to instructions received from the converged router.

12. The system of claim 11, wherein the wireless data connection is made via an internet protocol network.

13. The system of claim 11, wherein the wireless data connection is made using a media terminal adapter accessible through a hybrid fiber-cable network.

14. The system of claim 11, wherein the profile information is associated with an intended recipient of the voice call.

15. The system of claim 14, wherein the profile information is further based upon an originator of the voice call.

16. The system of claim 11, wherein the converged router is operable to perform a dynamic handoff between the wireless data connection and the cellular connection responsive to the mobile communications device moving into or out of range of the wireless data connection.

17. The system of claim 11, wherein the converged router is operable to instruct the network interface to make a connection attempt using the cellular connection, and if the connection attempt is not successful within a predetermined period of time, the network interface is instructed to make a connection attempt using the wireless data connection.

18. The system of claim 11, wherein the network interface is further operable to receive a beacon from the mobile communications device and the converged router is operable to record a location associated with the beacon in the location register.

19. The system of claim 18, wherein the beacon is further operable to include a wireless data connection status and the converged router is operable to record whether a wireless data connection is available to the mobile communications device.

* * * * *